(No Model.)

J. D. F. ANDREWS.
DYNAMO ELECTRIC MACHINE OR MOTOR.

No. 474,624. Patented May 10, 1892.

Attest:
C. M. Benjamin.
C. G. Curtis

Inventor:
Joseph D. F. Andrews,
by Read & Price
his attys

United States Patent Office.

JOSEPH D. F. ANDREWS, OF LONDON, ENGLAND, ASSIGNOR, BY MESNE ASSIGNMENTS, TO THE CURTIS ELECTRIC MANUFACTURING COMPANY, OF WEST VIRGINIA.

DYNAMO-ELECTRIC MACHINE OR MOTOR.

SPECIFICATION forming part of Letters Patent No. 474,624, dated May 10, 1892.

Application filed January 18, 1892. Serial No. 418,510. (No model.) Patented in England December 24, 1884, No. 16,916.

*To all whom it may concern:*

Be it known that I, JOSEPH D. F. ANDREWS, a subject of the Queen of Great Britain, residing at the city of London, in the county of Middlesex and Kingdom of England, have invented certain new and useful Improvements in Dynamo-Electric Machines or Motors, (for which Letters Patent have been granted to me in Great Britain, No. 16,916, dated December 24, 1884;) and I do hereby declare the following to be a full, clear, and exact description of the invention, such as will enable others skilled in the art to which it appertains to make and use the same.

My invention relates to multipolar dynamo-electric machines or motors which have for their armatures coiled rings of the Pacinotti or Gramme kind; and it consists, chiefly, in so connecting the coils to each other and to the plates of the commutator that an even number of polar fields—such as four, six, eight, &c.—may be arranged around the ring to operate effectively on the coils, producing greater power and uniformity of action than when only two polar fields are employed.

Figure 1:
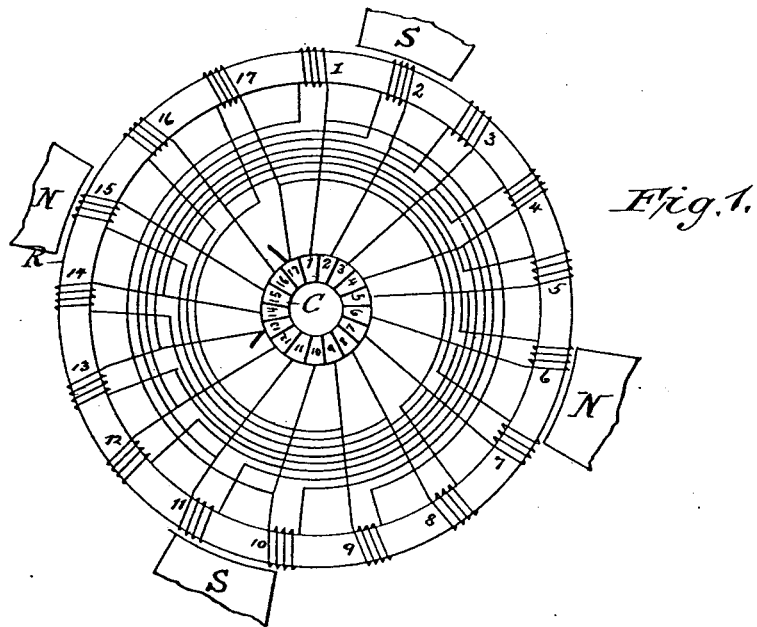
Figure 2:
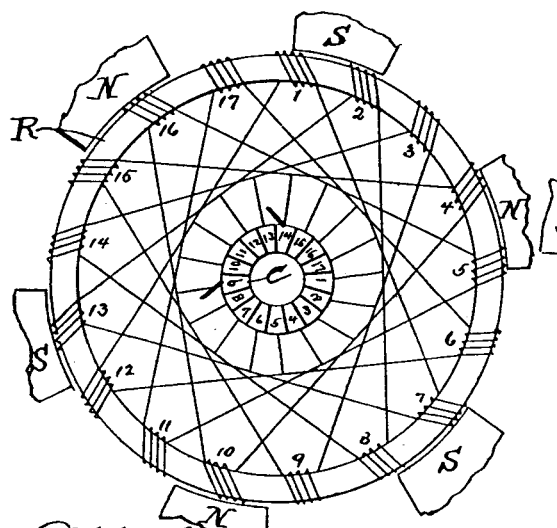
Figure 3:
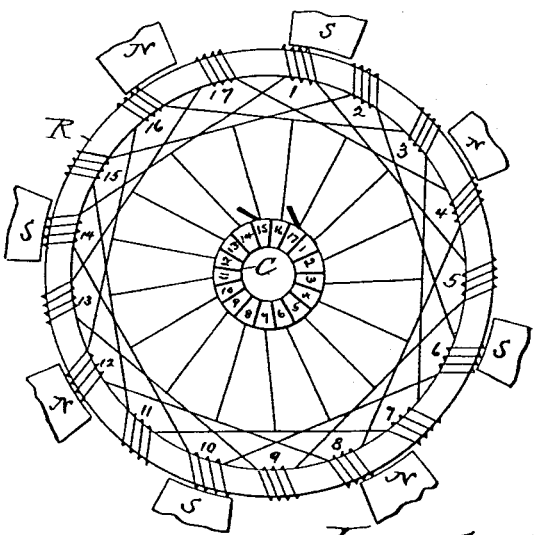

The mode of connection of the armature-coils which I adopt will be best understood by reference to the accompanying diagrams, Figures 1, 2, and 3, showing, respectively, the connections suitable for four, six, and eight polar fields, which are indicated by the letters N S.

There is a number of coils on the armature-ring R differing by one from a multiple of half the number of poles and a corresponding number of plates on the commutator C. In the diagrams there are seventeen coils and seventeen commutator-plates. In each case the two ends of any coil are connected to those of the other coils and to the commutator-plates in the following manner.

In Fig. 1, showing four polar fields, coil 1 has one of its ends connected to one end of 9 and its other end connected to the opposite end of 10, and these connections are connected, respectively, to plates 1 and 10 of the commutator. In like manner coil 2 has its one end connected to 10 and its other end to 11, connection being made from these to plates 2 and 11 of the commutator, and thus all around the ring each coil has its ends connected to the two coils which are situated one on each side of a point in the ring diametrically opposite to it, or to the eighth in order from it each way.

In Fig. 2, showing six polar fields, coil 1 has its ends connected to 7 and 12, coil 2 to 8 and 13, and so on—that is to say, each coil is connected to the sixth in order from it each way.

In Fig. 3, showing eight polar fields, coil 1 has its ends connected to 5 and 14, coil 2 to 6 and 15, and so on—that is to say, each coil is connected to the fourth in order from it each way.

There might obviously be around the ring an even number of polar fields greater than 8 and on the ring a number of coils exceeding 17, and the connections of the coils would be arranged in a manner similar to that described, so as to bring together in each case the action of all the coils that are approximately in the same phase. In Fig. 2, for instance, when coils 1 and 7 are entering the south field, coil 12, with which these are connected, is about to enter it. So the connected coils 4, 10, and 16 are in the north fields. In Fig. 1 in like manner the coils 2 and 11 are in south fields and 10 about to enter. In Fig. 3, again, coil 12 being in a north field, so, also, are coils 4, 8, and 16, with which it is connected. But two brushes are required, which should be set so as to divide the coils into approximately equal groups in multiple arc.

Having thus described my invention, what I claim as new, and desire to secure by Letters Patent, is—

1. A dynamo-electric machine or motor provided with an armature having a ring-core and two or more pairs of field-magnet poles, the armature-coils surrounding the core and connected together and to the commutator, so that all coils in approximately the same phase act together in series.

2. A dynamo-electric machine or motor provided with a ring-armature having a closed coil-winding and two or more pairs of field-magnet poles, the number of coils and commutator-segments differing by one from a multiple of half the number of field-magnet poles, said coils being connected together and to the commutator, so that all coils in approximately the same phase act together in series.

3. A dynamo-electric machine or motor provided with a ring-armature and two or more pairs of field-magnet poles, the armature coils or sections being connected together and to the commutator, so as to form a system of conductors comprising for any number of field-magnet poles two groups of coils in multiple arc, in which all the coils or sections in each group act in series relation.

4. A dynamo-electric machine or motor provided with a ring-armature and two or more pairs of field-magnet poles, each armature-coil being connected to a commutator-segment and to a coil on either side at a distance approximately equal to the space between two pole-pieces of like sign, so as to form a system of conductors comprising for any number of field-magnet poles two groups of coils in multiple arc, all of the coils in each group acting in series relation.

5. A dynamo-electric machine or motor provided with a ring-armature and two or more pairs of field-magnet poles, the armature coils or sections being connected together and to the commutator, so as to form a system of conductors comprising for any number of field-magnet poles two groups of coils in multiple arc, all of the coils in each group acting in series relation and successively connected coils being distant from each other on the ring twice the distance between adjacent field-magnet poles.

In testimony whereof I affix my signature in presence of two witnesses.

JOSEPH D. F. ANDREWS.

Witnesses:
GRAHAM T. W. OLVER,
JAMES WHITCHER.